United States Patent
Wang et al.

(10) Patent No.: US 8,950,954 B2
(45) Date of Patent: Feb. 10, 2015

(54) SIDE-EDGE MOUNTABLE PARALLEL OPTICAL COMMUNICATIONS MODULE, AN OPTICAL COMMUNICATIONS SYSTEM THAT INCORPORATES THE MODULE, AND A METHOD

(75) Inventors: Fang Wang, Singapore (SG); David J. K. Meadowcroft, San Jose, CA (US); Andrew G. Engel, Portola Valley, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 176 days.

(21) Appl. No.: 13/562,556

(22) Filed: Jul. 31, 2012

(65) Prior Publication Data

US 2014/0037254 A1    Feb. 6, 2014

(51) Int. Cl.
*G02B 6/36* (2006.01)
*G02B 6/44* (2006.01)
*G02B 6/00* (2006.01)
*G02B 6/42* (2006.01)

(52) U.S. Cl.
CPC ............ *G02B 6/4248* (2013.01); *G02B 6/4251* (2013.01)
USPC ................. 385/94; 385/88; 385/92; 385/114; 385/135

(58) Field of Classification Search
CPC .. G02B 6/4277; G02B 6/4248; G02B 6/4251; G02B 6/4284
USPC .................. 385/88, 89, 92–94, 114, 135, 136
See application file for complete search history.

(56) References Cited

U.S. PATENT DOCUMENTS

| | | |
|---|---|---|
| 4,848,870 A | 7/1989 | Wisecarver et al. |
| 5,037,175 A | 8/1991 | Weber |
| 5,046,955 A | 9/1991 | Olsson |
| 5,199,891 A | 4/1993 | Reed |
| 5,230,489 A | 7/1993 | White et al. |
| 5,448,670 A | 9/1995 | Blew et al. |
| 5,615,292 A | 3/1997 | Beckwith |
| 5,953,118 A | 9/1999 | O'Rourke et al. |
| 6,074,228 A | 6/2000 | Berg et al. |
| 6,201,704 B1 | 3/2001 | Poplawski et al. |
| 6,485,322 B1 | 11/2002 | Branch et al. |
| 6,846,115 B1 | 1/2005 | Shang et al. |

(Continued)

OTHER PUBLICATIONS

T. Sugimoto, Y. Hashimoto, K. Yamamoto, M. Kurihara, M. Oda, J. Sakai, H. Ono, T. Akagawa, K. Yashiki, H. Hatayama, N. Suzuki, M. Tsuji, I. Ogura, H. Kouta, K. Kurata; 12-Channel x 20-Gbps on-board Parallel Optical Modules using Multi-Chip Visual Alignment Technique; Electronic Components and Technology Conference (ECTC), Jun. 1-4, 2010, p. 256-262, Kawasaki, Kanagawa, Japan.

(Continued)

*Primary Examiner* — Kaveh Kianni
*Assistant Examiner* — Hung Lam

(57) ABSTRACT

A side-edge mountable parallel optical communications module and an optical communications system that incorporates one or more of the modules are provided. In the optical communications system, one or more of the side-edge mountable parallel optical communications modules are side-edge mounted in respective edge card connectors, which, in turn, are mounted on a surface of a motherboard PCB. Because the modules are relatively thin and because the spacing, or pitch, between the modules can be kept very small, the system can have a very high mounting density, and consequently, a very high bandwidth.

32 Claims, 7 Drawing Sheets

(56) References Cited

U.S. PATENT DOCUMENTS

| | | |
|---|---|---|
| 6,863,453 B2 | 3/2005 | Wang et al. |
| 6,893,293 B2 | 5/2005 | Ice et al. |
| 6,922,496 B2 | 7/2005 | Morris |
| 6,935,882 B2 | 8/2005 | Hanley et al. |
| 7,001,081 B2 | 2/2006 | Cox et al. |
| 7,150,653 B1 | 12/2006 | Mason |
| 7,195,403 B2 | 3/2007 | Oki et al. |
| 7,213,979 B2 | 5/2007 | Park |
| 7,234,880 B1 | 6/2007 | Charny et al. |
| 7,255,495 B2 | 8/2007 | Yi et al. |
| 7,303,336 B2 | 12/2007 | Kayner et al. |
| 7,374,347 B1 | 5/2008 | Oki et al. |
| 7,676,132 B1 | 3/2010 | Mandry et al. |
| 7,796,853 B2 | 9/2010 | Abernathy et al. |
| 8,364,000 B2 | 1/2013 | Gonzalez et al. |
| 8,770,864 B2 | 7/2014 | Ito |
| 2004/0203289 A1* | 10/2004 | Ice et al. ............... 439/607 |
| 2005/0025434 A1 | 2/2005 | Benner |
| 2005/0286837 A1 | 12/2005 | Oki et al. |
| 2007/0140621 A1 | 6/2007 | DeCusatis et al. |
| 2009/0129725 A1 | 5/2009 | Durrant et al. |
| 2009/0149037 A1 | 6/2009 | Lee et al. |
| 2011/0268390 A1* | 11/2011 | Yi et al. ............... 385/50 |
| 2013/0261396 A1 | 10/2013 | Boulais et al. |

OTHER PUBLICATIONS

K. Yashiki, T. Sugimoto, I. Ogura, K. Kurata; High Throughput on-Board Parallel Optical Modules using Multi-Chip Visual Alignment Technique; CPMT Symposium Japan; Aug. 24-26; 2010; p. 1-4, Kawasaki, Japan.

J.K. Hagge; State-of-the-Art Multichip Modules for Avionics; IEEE Transactions on Components, Hybrids, and Manufacturing Technology; Feb. 1992; p. 29-42, vol. 15 Issue 1, Cedar Rapids, Iowa.

Sven Rzepka, Kaustav Banerjee, Ekkehard Meusel and Chenming Hu, Characterization of Self-Heating in Advanced VLSI Interconnect Lines Based on Thermal Finite Element Simulation, Journal, Sep. 3, 1998, p. 406-411, vol. 21, No. 3, IEEE.

Israelsohn, Joshua ,"10-Gbps Fiber-Optic Transponders", *EDN Magazine*, www.edn.com, San Francisco, United States Feb. 6, 2003, 57-69.

Schaefer, George , "VI Systems Launches Tosa/Rosa Modules for the Next Generation Fibre Channel FC32G", Press Release, Berlin, Germany May 30, 2012.

* cited by examiner

SIDE-EDGE MOUNTABLE PARALLEL OPTICAL COMMUNICATIONS MODULE, AN OPTICAL COMMUNICATIONS SYSTEM THAT INCORPORATES THE MODULE, AND A METHOD

TECHNICAL FIELD OF THE INVENTION

The invention relates to parallel optical communications systems and methods.

BACKGROUND OF THE INVENTION

A parallel optical communications module is a module having multiple transmit (TX) channels, multiple receive (RX) channels, or both. Parallel optical communications modules that have both transmit and receive channels are known as parallel optical transceiver modules. In parallel optical transceiver modules, the TX portion comprises components for transmitting data in the form of modulated optical signals over multiple optical waveguides, which are typically optical fibers. The TX portion includes a plurality of laser driver circuits and a plurality of laser diodes. The laser driver circuits output electrical signals to the laser diodes to modulate them. When the laser diodes are modulated, they output optical signals that have power levels corresponding to logic 1s and logic 0s. An optics system of the module focuses the optical signals produced by the laser diodes into the ends of respective transmit optical fibers held within a connector that mates with the module.

Typically, the TX portion also includes a plurality of monitor photodiodes that monitor the output power levels of the respective laser diodes and produce respective electrical feedback signals that are fed back to a module controller. The controller processes the feedback signal to obtain respective average output power levels for the respective laser diodes. The controller outputs control signals to the laser driver circuit that cause it to adjust the modulation and/or bias current signals output to the respective laser diodes such that the average output power levels of the laser diodes are maintained at relatively constant levels.

The RX portion of a parallel optical transceiver module includes a plurality of receive photodiodes that receive incoming optical signals output from the ends of respective receive optical fibers held in the connector. The optics system of the module focuses the light that is output from the ends of the receive optical fibers onto the respective receive photodiodes. The receive photodiodes convert the incoming optical signals into electrical analog signals. An electrical detection circuit, such as a transimpedance amplifier (TIA), receives the electrical signals produced by the receive photodiodes and outputs corresponding amplified electrical signals, which are processed in the RX portion to recover the data.

There is a constant demand in the optical communications industry for parallel optical transceiver modules that are capable of transmitting and/or receiving ever-increasing amounts of data at ever-increasing speeds. To accomplish this, it is known to combine multiple parallel optical transceiver modules of the type described above to produce a parallel optical communications system that has a higher bandwidth than the individual parallel optical transceiver modules. A variety of parallel optical transceiver modules are used in such systems for this purpose. For example, one known parallel optical transceiver module of the type described above includes a multi-fiber connector module known in the industry as the MTP connector module. The MTP connector module plugs into a receptacle that is secured to a front panel of a rack of the optical communications system. The MTP connector module receives a duplex fiber ribbon cable having a total of 4, 8, 12, 24, or 48 optical fibers. Typically, half of the fibers of the ribbon cable are transmit fibers and the other half are receive fibers, although all of the fibers may be either transmit or receive fibers in cases where the module is being used as either a transmitter or a receiver, but not both.

When the MTP connector module is plugged into the receptacle, electrical contacts of the connector module are electrically connected with electrical contacts of a printed circuit board (PCB) of the transceiver module. The laser diodes and the photodiodes are integrated circuits (ICs) that are mounted on the PCB. A laser driver IC and a transceiver controller IC are typically also mounted on the PCB, although the transceiver controller IC is sometimes mounted on a motherboard PCB of the optical communications system.

It is known that multiple transceiver modules of the type that use the MTP connector module can be arranged in an array to provide an optical communications system that has an overall bandwidth that is generally equal to the sum of the bandwidths of the individual transceiver modules. One of the problems associated with such an array arises from the fact that the MTP connector modules are mounted by plugging them into receptacles formed in a front panel of a rack of the optical communications system. Because the modules are mounted in this manner, there must be sufficient space on the front panel to accommodate the receptacles and the respective MTP connector modules. Because space on the front panel is limited, the ability to increase bandwidth by increasing the size of the array is also limited.

An alternative to the mounting arrangement described above is to mid-plane mount the parallel optical transceiver modules. A mid-plane mounting configuration is one in which the modules are mounted in the plane of the motherboard PCB. One known parallel optical transceiver module that is mid-plane mounted is known in the industry as the Snap 12 transceiver module. The Snap 12 transceiver module comprises a 12-channel TX module and a 12-channel RX module. Each module has an array of 100 input/output (I/O) pins that plugs into a 100-pin ball grid array (BGA). The BGA is, in turn, secured to a motherboard PCB.

Other mid-plane mounting solutions exist for mounting multiple parallel optical transceiver modules on a motherboard PCB. One of the problems associated with the existing mid-plane mounting solutions is that there are limitations on the mounting density of the modules on the motherboard PCB. Each module has its own PCB, ball grid array, or other type of internal mounting structure that is parallel to the motherboard PCB. Thus, each module consumes spatial area, i.e., has a footprint, on the surface of the motherboard PCB. In addition, each of the modules must be spaced apart from adjacent modules on the motherboard PCB by some minimum spacing, or pitch. Because there is a finite spatial surface area on the motherboard PCB for mounting the modules, the mounting density of the modules is limited, which limits the overall bandwidth of the system.

A need exists for an optical communications system having a mounting configuration that enables parallel optical communications modules to be mounted with increased mounting density. Increasing the mounting density of the modules increases the amount of data that can simultaneously be transmitted and/or received by the optical communications system.

SUMMARY OF THE INVENTION

The invention is directed to side-edge mountable optical communications modules, optical communications systems that incorporate one or more of the modules, and methods for high-density mounting of parallel optical communications modules. In accordance with one embodiment, the optical communications system comprises a motherboard PCB, at least a first edge card connector, at least a first parallel optical communications module (POCM), and a first metal housing. The first edge card connector is mounted on an upper surface of the motherboard PCB. The first POCM comprises a first module PCB having at least first and second parallel optical communications sub-modules (POCSMs) mounted thereon and electrically interconnected with the module PCB. A lower side edge of the first module PCB has electrical contacts thereon and is disposed within a slot of the first edge card connector such that electrical contacts disposed on the lower side edge of the first module PCB are in contact with electrical contacts of the first edge card connector. The first metal housing substantially surrounds the first POCM and has an opening formed therein through which ends of at least first and second optical fiber ribbon cables pass. The ends of the first and second optical fiber ribbon cables are connected to the first and second POCSMs, respectively. The first metal housing acts as an electromagnetic interference (EMI) shield for the first POCM and protects the first module PCB and the first and second POCSMs from the environment.

In accordance with another embodiment, the system comprises a motherboard PCB, at least a first edge card connector mounted on an upper surface of the motherboard PCB, and at least a first POCM. The first POCM comprises at least first and second POCSMs that are mounted on first and second module PCBs, respectively, and that are electrically interconnected with the first and second module PCBs, respectively. The lower side edges of the first and second module PCBs have electrical contacts thereon and are disposed within a slot of the first edge card connector such that the electrical contacts disposed on the lower side edges of the first and second module PCBs are in contact with electrical contacts of the first edge card connector In accordance with one embodiment, the method comprises:

providing a motherboard PCB;

mounting at least a first edge card connector on the upper surface of the motherboard PCB;

providing at least a first POCM comprising a first module PCB having at least first and second POCSMs mounted thereon and electrically interconnected with the first module PCB; and inserting a lower side edge of the first module PCB into a slot of the first edge card connector such that electrical contacts disposed on the lower side edge of the first module PCB are in contact with electrical contacts of the first edge card connector.

In accordance with one embodiment, the method comprises:

providing a motherboard PCB;

mounting at least a first edge card connector on an upper surface of the motherboard PCB;

providing at least a first POCM comprising at least a first and second POCSMs that are mounted on first and second module PCBs, respectively, and that are electrically interconnected with the first and second module PCBs, respectively; and inserting lower side edges of the first and second module PCBs into a slot of the first edge card connector such that electrical contacts disposed on the lower side edges of the first and second module PCBs are in contact with electrical contacts of the first edge card connector.

These and other features and advantages of the invention will become apparent from the following description, drawings and claims.

DETAILED DESCRIPTION OF AN ILLUSTRATIVE EMBODIMENT

Figure 1:
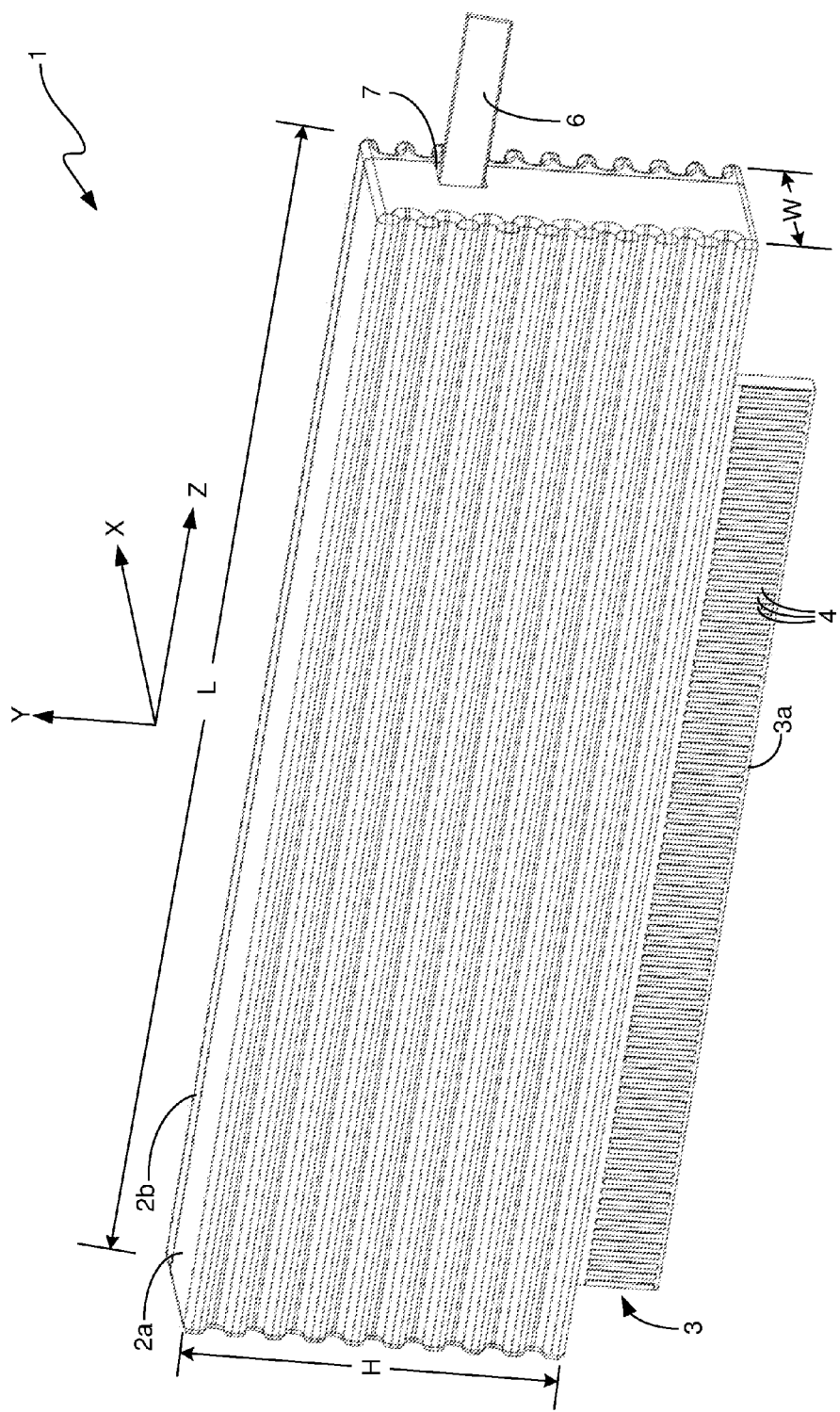
FIG. 1 illustrates a perspective view of the side-edge mountable parallel optical communications modules in accordance with an illustrative embodiment.

The invention is directed to a side-edge mountable parallel optical communications module and an optical communications system that incorporates one or more of the modules. In the optical communications system, one or more of the side-edge mountable parallel optical communications modules are side-edge mounted in respective edge card connectors, which, in turn, are mounted on a surface of a motherboard PCB. Because the modules are relatively thin and because the spacing, or pitch, between the modules can be kept very small, the system can have a very high mounting density, and consequently, a very high bandwidth. These and other features of the invention will now be described with reference to the illustrative, or exemplary, embodiments shown in the figures, in which like reference numerals represent like elements, components or features.

Figure 2:
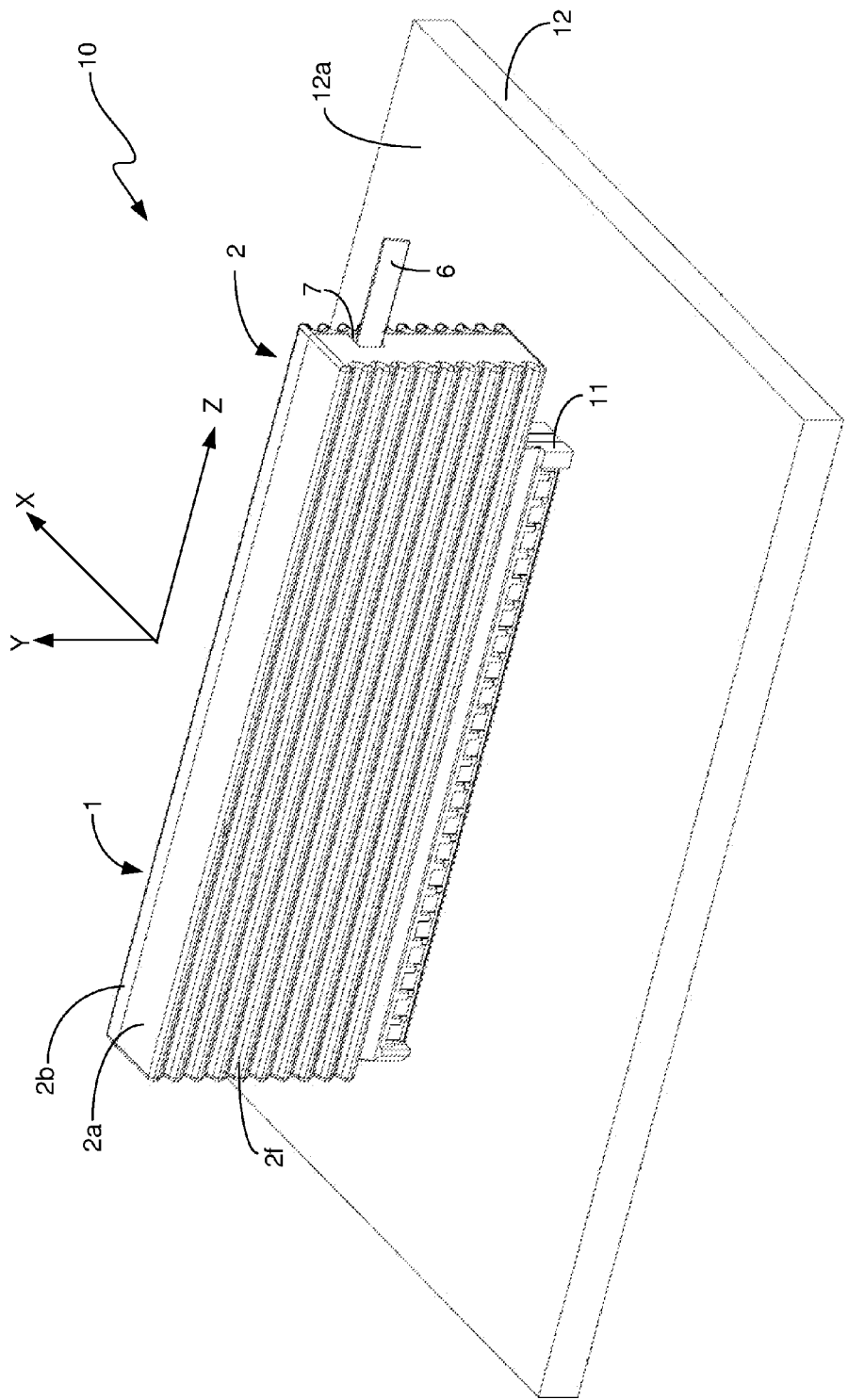
FIG. 2 illustrates a perspective view of an optical communications system that includes the side-edge mountable parallel optical communications module shown in FIG. 1, an edge card connector in which the lower side edge of the module is inserted, and a motherboard PCB having an upper surface on which the edge card connector is mounted.
Figure 3:
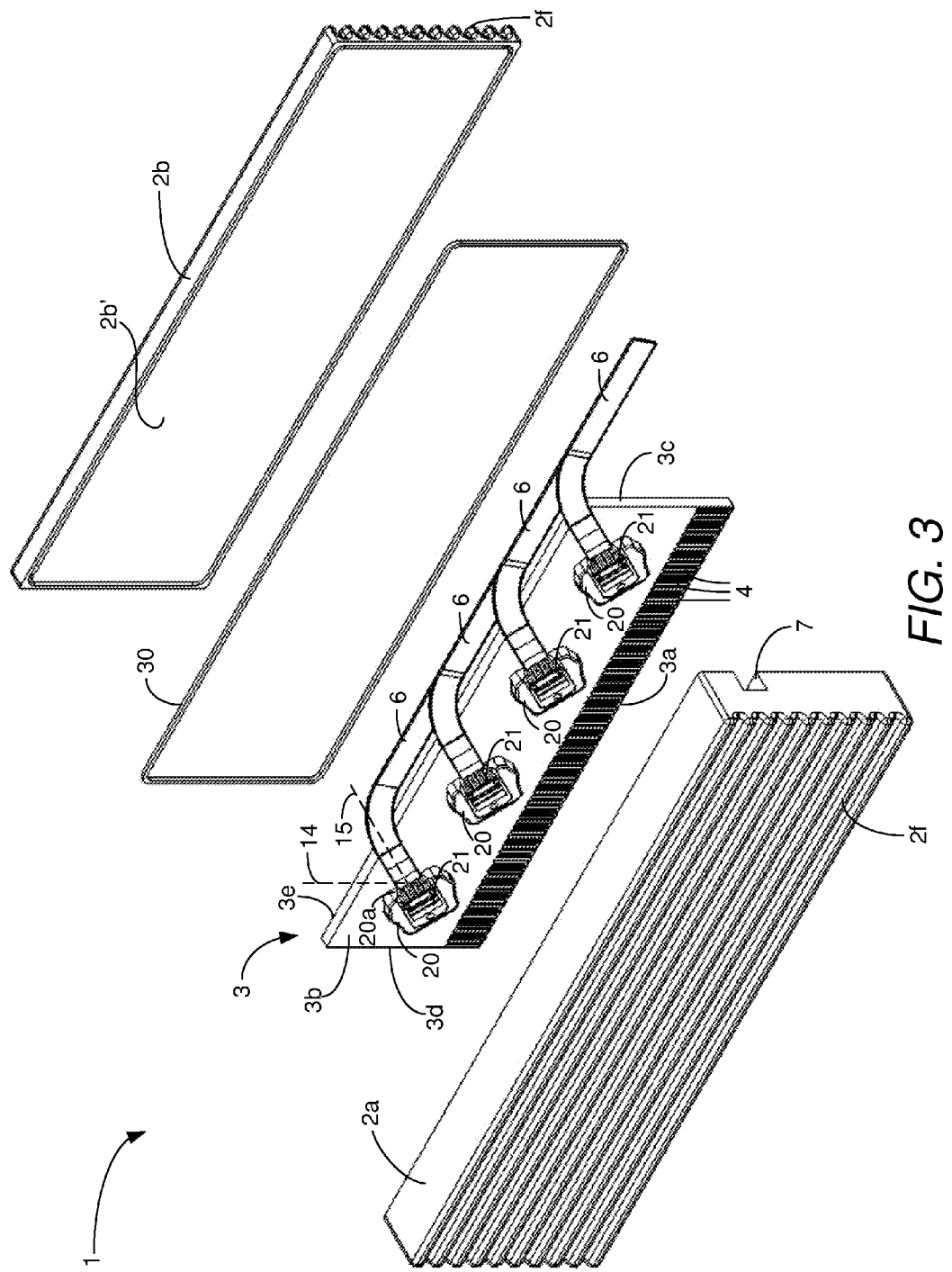
FIG. 3 illustrates an exploded front perspective view of the side-edge mountable parallel optical communications module shown in FIG. 1, which shows multiple parallel optical communications sub-modules that are contained within the module.
Figure 4:
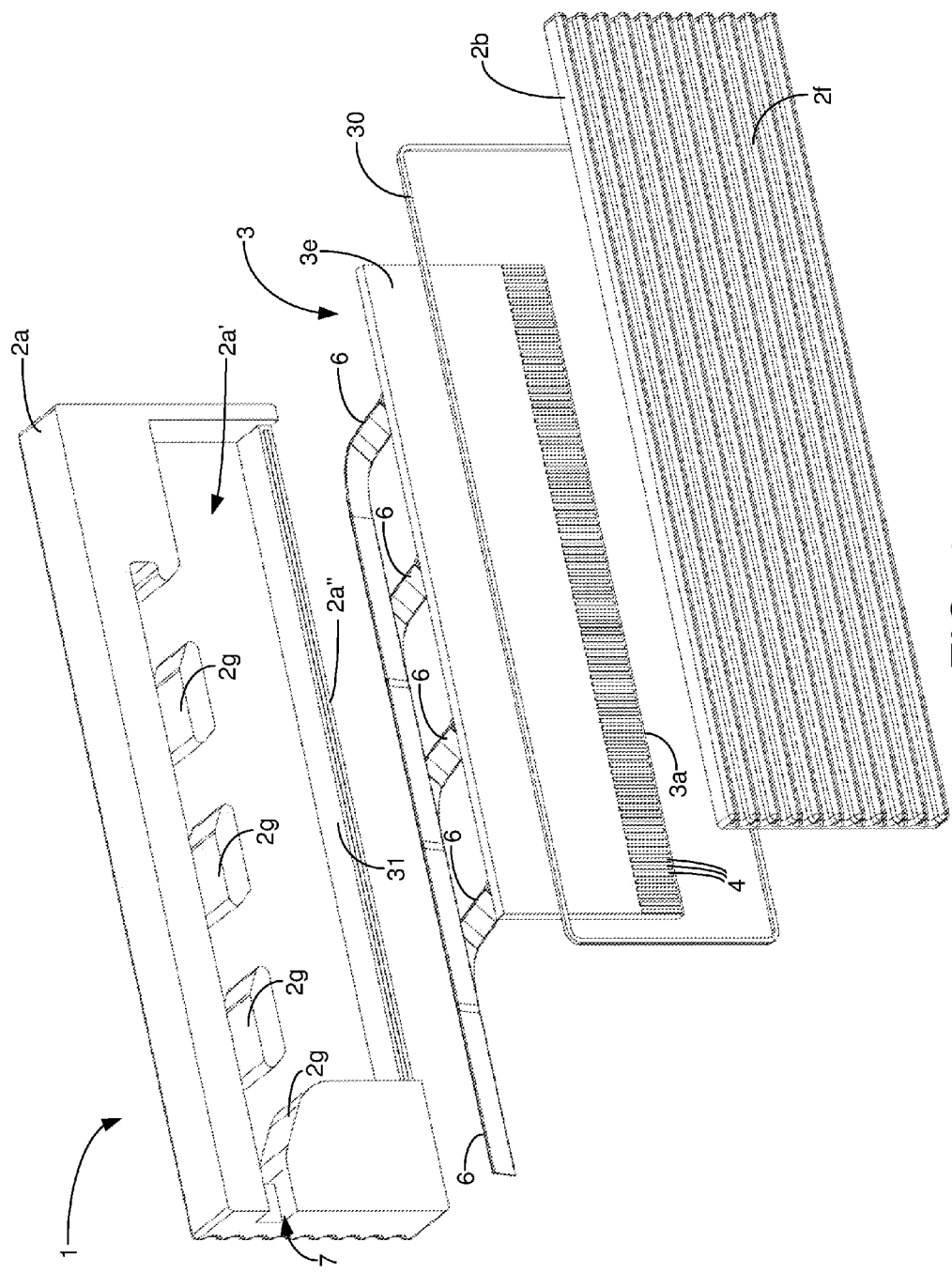
FIG. 4 illustrates an exploded back perspective view of the side-edge mountable parallel optical communications module shown in FIG. 1.
Figure 5:
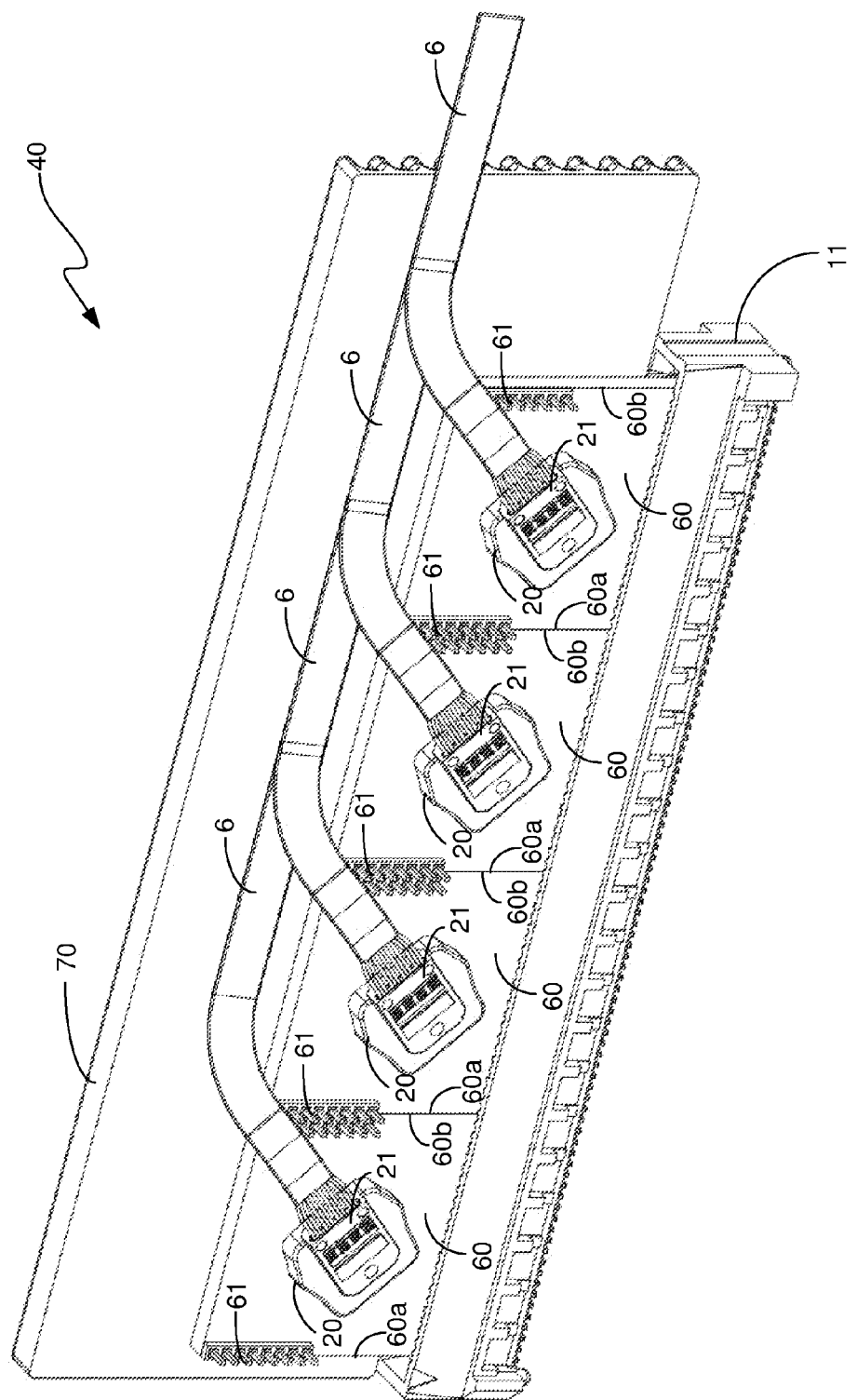
FIG. 5 illustrates a perspective view of the side-edge mountable parallel optical communications module in accordance with another illustrative embodiment, which includes a plurality of the parallel optical communications sub-modules shown in FIG. 3.
Figure 6:
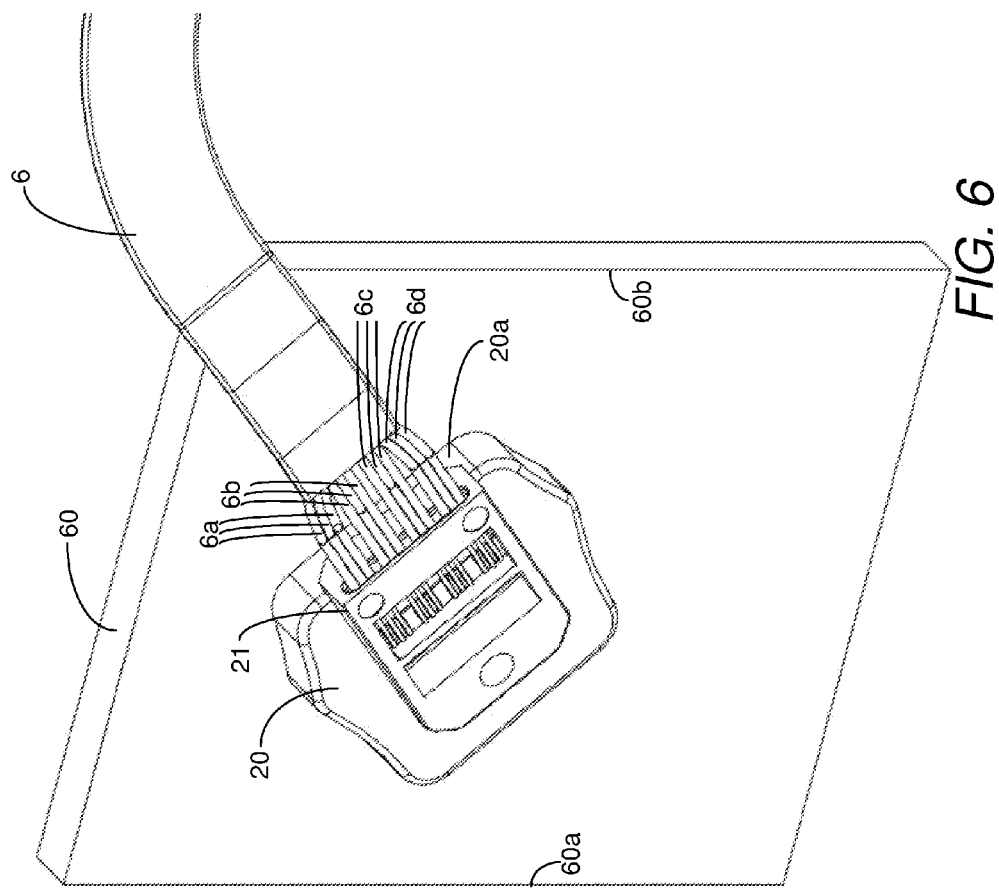
FIG. 6 illustrates a top perspective view of one of the sub-modules that are contained in the side-edge mountable parallel optical communications module shown in FIG. 5.
Figure 7:
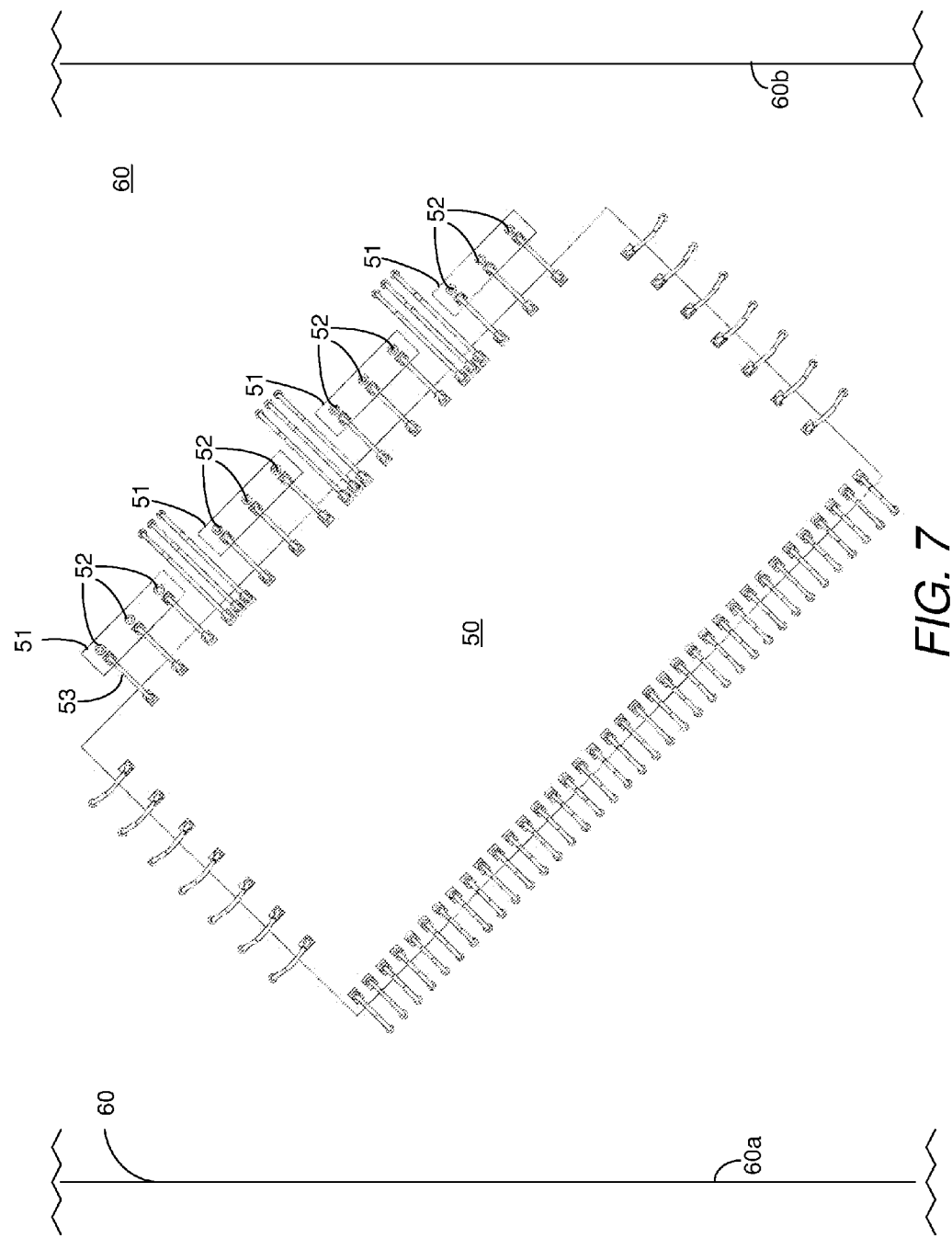
FIG. 7 illustrates a driver IC chip and four VCSEL chips that are part of each of the sub-modules shown in FIGS. 3-5.

FIG. 1 illustrates a perspective view of the side-edge mountable parallel optical communications modules 1 in accordance with an illustrative embodiment. FIG. 2 illustrates a perspective view of an optical communications system 10 that includes the side-edge mountable parallel optical communications module 1 shown in FIG. 1, an edge card connector 11 in which the lower side edge of the module 1 is inserted, and a motherboard PCB 12 having an upper surface 12a on which the edge card connector 11 is mounted. FIG. 3 illustrates an exploded front perspective view of the side-edge mountable parallel optical communications module 1 shown in FIG. 1, which shows multiple parallel optical communications sub-modules 20 that are contained within the module 1. FIG. 4 illustrates an exploded back perspective view of the side-edge mountable parallel optical communications module 1 shown in FIG. 1. FIG. 5 illustrates a perspective view of the side-edge mountable parallel optical communications module 40 in accordance with another illustrative embodiment, which includes a plurality of the parallel optical communications sub-modules 20 shown in FIG. 3. FIG. 6 illustrates a top perspective view of one of the sub-modules 20 that are contained in the side-edge mountable parallel optical communications module 40 shown in FIG. 5. FIG. 7 illustrates a driver IC chip 50 and four VCSEL chips 51 that are part of each of the sub-modules 20 shown in FIGS. 3-5. Features and advantages of the invention will now be described with reference to FIGS. 1-7.

The side-edge mountable parallel optical communications module 1 has a length, L, in the Z direction, a width, W, in the X direction and a height, H, in the Y direction (FIG. 1). The module 1 is encased inside of a module housing 2 that has a front module housing portion 2a and a back module housing portion 2b, which are mechanically coupled together (FIG. 2) by any suitable mechanical coupling mechanism. The module 1 includes a module PCB 3 (FIGS. 3 and 4) that has electrical contacts 4 disposed on a lower side edge 3a thereof. A stack of optical fiber ribbon cables 6 pass through a small opening 7 formed in one end of the housing 2 (FIGS. 1-4).

In the optical communications system 10 shown in FIG. 2, the side-edge mountable parallel optical communications module 1 is mounted in an edge card connector 11, which is mounted on the upper surface 12a of the motherboard PCB 12. The edge card connector 11 has electrical contacts on one or both of its internal surfaces that come into contact with the electrical contacts 4 (FIGS. 3 and 4) disposed on the lower side edge 3a of the module PCB 3 (FIG. 1). Through these electrical connections and through electrically-conductive traces of the module PCB 3 and of the motherboard PCB 12, electrical circuitry 50 and 51 (FIG. 7) within sub-modules 20 (FIG. 3) is electrically interconnected with other electrical circuitry (not shown) mounted on the motherboard PCB 12, such as, for example, a hub controller IC (not shown). For ease of illustration, the electrically-conductive traces and the other electrical circuitry that may be mounted on the motherboard PCB are not shown in the figures.

As shown in the exploded view of FIG. 3, a plurality of parallel optical communications sub-modules 20 are mounted on an upper surface 3b of the module PCB 3. Thus each of the side-edge mountable parallel optical communications module 1 (FIGS. 1 and 2), comprises a plurality of (e.g., four) parallel optical communications sub-modules 20. Each of the parallel optical communications sub-modules 20 is optically and mechanically coupled by a connector 21 to an end of a respective optical fiber ribbon cable 6. It can be seen in FIG. 3 that the parallel optical communications sub-modules 20 are mounted at an angle to the right and left side edges 3c and 3d, respectively, of the module PCB 3. The dashed line 14 shown in FIG. 3 is parallel to the right and left side edges 3c and 3d of the module PCB 3. The dashed line 15 shown in FIG. 3 is normal to a plane in which the back side 20a of the module 20 substantially resides. The angle between the dashed lines 14 and 15 is greater than 0° and less than 90°, but is typically between about 30° and 60°. The selection of the angle is based in part on the intended directions of the cables 6 and in part on the X- and Y-dimensions of the PCB 3. This type of angled mounting configuration is different from known mounting configurations in which the modules are typically mounted such that the back side of the module is in is at an angle of either 0° or 90° to the side edges of the module PCB.

Orienting the sub-modules 20 at this angle results in a smaller bend in the optical fiber ribbon cables 6 as they extend in the directions shown in FIG. 3 out of the opening 7 formed in the module housing 2. The smaller bends in the cables 6 helps prevent damage to the cables 6 and optical losses. This smaller bend also helps to reduce the tension on the cables 6, which helps reduce stress on the connectors 21. The reduced stress on the connectors 21 improves the reliability of the connections between the connectors 21 and the cables 6 and between the modules 20 and the connectors 21, which helps to improve the quality, or maintain a high integrity, of the digital signal. In addition, this feature extends the lifetimes of the cables 6 and of the connectors 21.

A metal electromagnetic interference (EMI) gasket 30 (FIGS. 3 and 4) is sandwiched in between the lower surface 3e of the module PCB 3 and an inner surface 2b' of the back module housing portion 2b. The combination of the metal module housing 2 and the EMI gasket 30 provides a completely sealed enclosure that operates as an excellent EMI barrier, or shield.

In addition, the module housing 2 has excellent thermal conductivity and makes good contact with heat dissipation devices (not shown) of the sub-modules 20 and/or of the module PCBs 3 through thermal interface materials and/or thermal vias (not shown). Thus, the metal housing is configured to spread and to dissipate large amounts of heat. In addition, the module housing 2 preferably has external fins 2f on it that improve thermal convection of heat from the module housing 2 into the surrounding environment. The module housing 2 also acts as a barrier to dust, dirt and contaminants and provides mechanical protection for the module PCB 3, the sub-modules 20 and the ribbon cables 6. The module housing 2 also provides the module 1 with high versatility by sealing the module 1 off from dust and EMI emission in that the module housing 2 allows the module 1 to be used inside or outside of a chassis (not shown).

As shown in the exploded view of FIG. 4, the inner side 2a' of the front module housing portion 2a has guide surfaces 2g formed therein that hold the optical fiber ribbon cables 6 together and guide them through the housing 2. This feature helps protect the ribbon cables 6 from accidental pulling or twisting, which could otherwise lead to disconnection of the ribbon cables 6 from their respective connectors 21 and/or the connectors 21 from their respective sub-modules 20. This feature also presses the cables 6 together into a tight stack to enable the stack to pass through opening 7, which is made very small in order to limit the amount of EMI that can pass out of the housing 2 through the opening 7. In addition, a second EMI gasket 31 is disposed on top of a lower inner surface 2a'' of the front module housing portion 2a as an additional measure to help prevent EMI emissions from passing out of the housing 2.

In accordance with an illustrative embodiment, each of the sub-modules 20 has twelve channels (not shown) for simultaneously transmitting and/or receiving twelve respective optical data signals over twelve respective optical fibers of the optical fiber ribbon cables 6. For each of the sub-modules 20, the twelve channels can be transmit channels, receive channels, or a combination of transmit and receive channels. In other words, each of the sub-modules 20 can be configured as a parallel optical transmitter module, a parallel optical receiver module or a parallel optical transceiver module. Thus, in accordance with the illustrative embodiment in which each sub-module 20 has twelve channels and each module 1 has four sub-modules 20, the module 1 is capable of simultaneously transmitting and/or receiving forty-eight optical data signals. Each channel may have a data rate of, for example, 10 gigabits per second (Gbps) or higher, although the invention is not limited with respect to the data rate of the channels.

The terms "parallel optical communications module" and "parallel optical communications sub-module," as those terms are used herein, denote a parallel optical transmitter module or sub-module, a parallel optical receiver module or sub-module, or a parallel optical transceiver module or sub-module.

Although only a single parallel optical communications module 1 is shown mounted on the motherboard PCB 12 in FIG. 2, there will typically be a plurality of the modules 1 mounted side-by-side on the motherboard PCB 12 and spaced apart from each other in the X direction by a small spacing, or pitch. The width, W, of the module 1 in the X direction is relatively small, despite the fact that the module 1 contains, for example, four parallel optical communications sub-modules 20. The small width and spacing allows a large number of modules 1 to be mounted side-by-side on the motherboard PCB 12 to provide an optical communications system 10 that has a very high density of modules 1 and sub-modules 20, and consequently, a very high bandwidth.

For example, assuming that (1) at least four of the modules 1 are side-edge mounted in respective edge card connectors 11, (2) each module 1 contains four of the sub-modules 20, (3) each sub-module 20 has six transmit channels and six receive channels, and (4) each channel has a data rate of 10 Gbps, then the system 10 would have an overall bandwidth of: 4×4×12× 10=1920 Gbps, which equals 1.875 terabits per second (Tbps). This high bandwidth is achievable with a relatively small footprint on the motherboard PCB 12 due in part to the fact that the sub-modules 20 consume more space in the Y-dimension than in the X- and Z-dimensions. Known parallel optical communications systems such as those described above have larger footprints on the motherboard PCB due in large part to the fact that they consume very large amounts of space in the X- and/or Z-dimensions, but relatively small amounts of space in the Y-dimension.

With reference to FIG. 5, the parallel optical communications module 40 in accordance with this illustrative embodiment is very similar to the parallel optical communications module shown in FIG. 3 except that each of the sub-modules 20 is mounted on respective sub-module PCBs 60 instead of being mounted on the same module PCB. As with the sub-modules 20 shown in FIG. 3, the sub-modules 20 shown in FIG. 5 are each mechanically coupled to a respective optical fiber ribbon cable 6 by a respective connector 21. The sub-modules 20 are mounted at an angle to the vertical side edges 60a and 60b of their respective PCBs 60 in the same way in which the sub-modules 20 shown in FIG. 3 are mounted at an angle with respect to the vertical side edges 3c and 3d of the PCB 3. The lower side edges of the sub-module PCBs 60 are inserted into an edge card connector 11 that may be identical to the edge card connector 11 shown in FIG. 2. The lower side edges of the sub-module PCBs 60 have electrical contacts on them (not shown) that may be identical to the electrical contacts 4 shown in FIG. 3. Optional jumper connectors or other interlink devices 61 are located on the vertical side edges 60a and 60b of the sub-module PCBs 60 to provide communication channels between the sub-module PCBs 60. Providing such communication channels between the sub-module PCBs 60 reduces the number of electrical contacts that are needed on the lower side edges of the sub-module PCBs 60 and on the inner surfaces of the edge card connector 11.

Although not shown in FIG. 5 for ease of illustration, the PCBs 60 may have thermal vias on them that are located underneath the heat-generating elements (e.g., laser diodes and driver ICs, described below with reference to FIG. 7) of the sub-modules 20 to allow heat generated by these elements to be conducted to the backsides of the PCBs 60. In accordance with this illustrative embodiment, one common heat dissipation plate 70 is secured to the backsides of the PCBs 60 to combine them into one pluggable PCB assembly. The mounting of the PCBs 60 to the plate 70 may be accomplished by using, for example, adhesive, a thermal pad, mechanical fasteners, or a combination of one or more of these mounting mechanisms. As with the system 10 shown in FIG. 2, the edge card connector 11 may be mounted on a motherboard PCB similar or identical to motherboard PCB 12. Also, the parallel optical communications module 40 shown in FIG. 5 may be housed in a housing that is similar or identical to the housing 2 shown in FIGS. 1-4 in order to provide the module 40 with protection from environmental elements and to provide EMI shielding for the module 40.

With respect to FIG. 6, it can be seen that, in accordance with this illustrative embodiment, the optical fiber ribbon cable 6 has twelve fibers that are grouped into four groups of three, which are labeled 6a, 6b, 6c, and 6d. This is because of the manner in which the laser diodes 52 are oriented, as shown in FIG. 7. The laser diode driver IC 50 is connected by electrically-conductive leads 53 to four VCSEL chips 51. Each VCSEL chip 51 has a 1-by-3 array of laser diodes 52. In known twelve-channel parallel optical communications modules, the laser diodes are typically formed on a substrate in a one-dimensional 1-by-12 array or in a two-dimensional 3-by-4 or 2-by-6 array. In accordance with one aspect of the invention, it has been determined the yield in producing chips that have these types of arrays is relatively low, which increases production costs. The low yield is attributable in part to the fact that if a defect is detected in one of the laser diodes of the chip, the entire chip is unusable and is therefore discarded. For a processing system that operates at a 3-sigma quality level, for example, at least 99.7% laser diodes formed on the wafer are good. However, because the defective diodes are randomly located, the probability of obtaining a 1-by-12, a 3-by-4 or a 2-by-6 array of good (i.e., non-defective) diodes is much less than 99.7%. For this reason, a large portion of the wafer is wasted, which results in reduced yield and higher costs.

In accordance with one aspect of the invention, a twelve-laser diode array is formed from four chips, each of which carries a 1-by-3 array of laser diodes. Because the probability of finding 1-by-3 arrays of non-defective laser diodes on a wafer is much higher than finding 1-by-12, a 3-by-4 or a 2-by-6 arrays of non-defective laser diodes on the wafer, production yield is drastically improved. In accordance with an illustrative embodiment, a pick-and-place machine is used to place the drive IC chip 50 and the four VCSEL chips 51 on the substrate of the PCB 60 with the VCSEL chips 51 aligned to form a one-dimensional array of twelve VCSEL laser diodes 52. A reflow soldering process is then used to permanently attach the chips 50 and 51 to the substrate of the PCB 60.

Because the spacing between adjacent VCSEL chips 51 is greater than the spacing between adjacent laser diodes 52 on the same VCSEL chip 51, the optical fibers are arranged into the four groups 6a, 6b, 6c, and 6d. The connectors 21 are designed such that when the fibers 6a-6d are connected to the respective connectors 21 and the connectors 21 are connected to the respective sub-modules 20, the respective fibers 6a-6d are aligned with the respective laser diodes 52.

The invention is not limited with respect to the type or configuration of the parallel optical communications sub-modules 20 that are used in the modules 1 and 40. Examples of parallel optical communications modules that are suitable for this purpose are disclosed in U.S. Pat. Nos. 7,331,720, and 8,036,500, which are assigned to the assignee of the present application and which are incorporated by reference herein in their entireties. However, many other known parallel optical transceiver modules are also suitable for this purpose. Therefore, in the interest of brevity, the features of the sub-modules 20 will not be described herein in further detail.

The invention also is not limited with respect to the type or configuration of the edge card connector 11 that is used. The edge card connector 11 may be a known edge card connector, such as, for example, a peripheral component interface express (PCIe) edge card connector, or it may be an edge card connector that is specifically designed for this purpose using existing edge card connector manufacturing processes. PCIe edge card connectors have one-hundred-and-fifty electrically-conductive contacts for data signals and twenty electrically-conductive contacts for control signals, which is sufficient for communicating with the parallel optical communications sub-modules 20 via the electrical traces, contacts, vias, etc. of the PCBs 3, 12 and 60.

It should be noted that the invention has been described with reference to illustrative embodiments for the purposes of describing the principles and concepts of the invention. As will be understood by persons skilled in the art, the invention is not limited to these illustrative embodiments and that many modifications can be made to the embodiments described herein without deviating from the scope of the invention. As will be understood by persons of skill in the art, all such modifications are within the scope of the invention.

What is claimed is:

1. An optical communications system comprising:
a motherboard printed circuit board (PCB) having at least upper and lower surfaces that are generally parallel to one another;
at least a first edge card connector mounted on the upper surface of the motherboard PCB, the first edge card connector having at least first and second side walls that face one another and that are separated from one another by an air gap that forms a slot in the edge card connector, the edge card connector having electrical contacts disposed on at least one of the first and second side walls inside of the slot;
at least a first parallel optical communications module (POCM) comprising a first module PCB having at least first and second parallel optical communications sub-modules (POCSMs) mounted thereon and electrically interconnected with the module PCB, a lower side edge of the first module PCB having electrical contacts thereon and being disposed within the slot of the first edge card connector such that the electrical contacts disposed on the lower side edge of the first module PCB are in contact with the electrical contacts of the first edge card connector, the lower side edge of the first module PCB is parallel to the upper surface of the motherboard PCB, and a plane of the first module PCB is oriented perpendicular to the upper surface of the motherboard, wherein the first and second POCSMs are mounted at an angle between zero and 90 degrees with respect to the lower side edge of the first module PCB; and
a first metal housing that substantially surrounds the first POCM, a wall of the first metal housing having an opening formed therein through which ends of at least first and second optical fiber ribbon cables pass in an orientation stacked together and substantially perpendicular to the wall, the first and second optical fiber ribbon cables curving in an arcuate shape within the housing between an orientation substantially perpendicular to the wall and the POCSMs, the ends of the first and second optical fiber ribbon cables being oriented at the angle at which the first and second POCSMs are mounted and being connected to first and second POCSMs, respectively, the first metal housing acting as an electromagnetic interference (EMI) shield for the first POCM and protecting the first module PCB and the first and second POCSMs from an environment surrounding the POCM.

2. The optical communications system of claim 1, further comprising:
at least a second edge card connector mounted on the upper surface of the motherboard PCB beside the first edge card connector and spaced apart from the first edge card connector, the second edge card connector having at least first and second side walls that face one another and that are separated from one another by an air gap that forms a slot in the second edge card connector, the second edge card connector having electrical contacts disposed on at least one of the first and second side walls inside of the slot of the second edge card connector;
at least a second POCM comprising a second module PCB having at least third and fourth POCSMs mounted thereon and electrically interconnected with the second module PCB, a lower side edge of the second module PCB having electrical contacts thereon and being disposed within the slot of the second edge card connector such that the electrical contacts disposed on the lower side edge of the second module PCB are in contact with the electrical contacts of the second edge card connector; and
a second metal housing that substantially surrounds the second POCM, the second metal housing having an opening formed therein through which ends of at least third and fourth optical fiber ribbon cables pass, the ends of the third and fourth optical fiber ribbon cables being connected to the third and fourth POCSMs, respectively, the second metal housing acting as an EMI shield for the second POCM and protecting the second module PCB and the third and fourth POCSMs from an environment surrounding the second POCM.

3. The optical communications system of claim 2, further comprising:
at least first and second EMI gaskets, the first EMI gasket being disposed in between an inner side wall of the first metal housing and the first and second POCSMs, the second EMI gasket being disposed in between an inner side wall of the second metal housing and the third and fourth POCSMs, wherein the first and second EMI gaskets act as additional EMI shields for the first and second POCMs.

4. The optical communications system of claim 2, wherein the first and second module PCBs each have first and second vertical side edges that are substantially parallel to one another, the first and second vertical side edges of the first and second module PCBs being substantially perpendicular to the lower side edges of the first and second module PCBs, respectively, and wherein the first and second POCSMs are mounted at an angle to the first and second vertical side edges of the first module PCB that is greater than zero degrees and less than ninety degrees, and wherein the third and fourth POCSMs are mounted at an angle to the first and second vertical side edges of the second module PCB that is greater than zero degrees and less than ninety degrees.

5. The optical communications system of claim 2, wherein the first and second POCSMs are mounted at an angle to the first and second vertical side edges of the first module PCB that is between about thirty degrees and about sixty degrees, and wherein the third and fourth POCSMs are mounted at an angle to the first and second vertical side edges of the second module PCB that is between about thirty degrees and about sixty degrees.

6. The optical communications system of claim 2, wherein the first, second, third, and fourth POCSMs each have at least a first laser diode driver integrated circuit (IC) chip and at least first, second, third, and fourth vertical cavity surface emitting laser diode (VCSEL) chips, each VCSEL chip having at least three vertical cavity surface emitting laser diodes (VCSELs) such that each POCSM has at least twelve transmit channels.

7. The optical communications system of claim 2, wherein at least first and second outer side walls of the first and second metal housings have fins on them to facilitate convection cooling.

8. An optical communications system comprising:
a motherboard printed circuit board (PCB) having at least upper and lower surfaces that are generally parallel to one another;
at least a first edge card connector mounted on the upper surface of the motherboard PCB, the first edge card connector having at least first and second side walls that face one another and that are separated from one another by an air gap that forms a slot in the edge card connector, the edge card connector having electrical contacts disposed on at least one of the first and second side walls inside of the slot; and
at least a first parallel optical communications module (POCM) comprising at least a first and second parallel optical communications sub-modules (POCSMs) mounted on substantially co-planar first and second module PCBs, respectively, and electrically interconnected with the first and second module PCBs, respectively, wherein lower side edges of the first and second module PCBs having electrical contacts thereon and are disposed within the slot of the first edge card connector such that the electrical contacts disposed on the lower side edges of the first and second module PCBs are in contact with the electrical contacts of the first edge card connector, the lower side edge of the first module PCB is parallel to the upper surface of the motherboard PCB, and a plane of the first module PCB is oriented perpendicular to the upper surface of the motherboard PCB, wherein the first and second POCSMs are mounted at an angle between zero and 90 degrees with respect to the lower side edge of the first module PCB; and
a first metal housing that substantially surrounds the first POCM, the first metal housing having an opening formed therein through which ends of at least first and second optical fiber ribbon cables pass in an orientation stacked together and substantially perpendicular to the wall, the first and second optical fiber ribbon cables curving in an arcuate shape within the housing between an orientation substantially perpendicular to the wall and the POCSMs, the ends of the first and second optical fiber ribbon cables being oriented at the angle at which the first and second POCSMs are mounted and being connected to the first and second POCSMs, respectively, the first metal housing acting as an electromagnetic interference (EMI) shield for the first POCM and protecting the first and second module PCBs and the first and second POCSMs from an environment surrounding the first POCM.

9. The optical communications system of claim 8, further comprising:
at least a second edge card connector mounted on the upper surface of the motherboard PCB beside the first edge card connector and spaced apart from the first edge card connector, the second edge card connector having at least first and second side walls that face one another and that are separated from one another by an air gap that forms a slot in the second edge card connector, the second edge card connector having electrical contacts disposed on at least one of the first and second side walls inside of the slot of the second edge card connector; and
at least a second POCM comprising at least third and fourth POCSMs mounted on third and fourth module PCBs, respectively, and electrically interconnected with the third and fourth module PCBs, respectively, wherein lower side edges of the third and fourth module PCBs have electrical contacts thereon and are disposed within the slot of the second edge card connector such that the electrical contacts disposed on the lower side edges of the third and fourth module PCBs are in contact with the electrical contacts of the second edge card connector.

10. The optical communications system of claim 8, further comprising:
at least a first metal heat dissipation plate secured to bottom surfaces of the first and second module PCBs for dissipating heat produced by the first and second POCSMs.

11. The optical communications system of claim 8, further comprising:
at least a second metal heat dissipation plate secured to bottom surfaces of the third and fourth module PCBs for dissipating heat produced by the third and fourth POCSMs.

12. The optical communications system of claim 9, further comprising:
a second metal housing that substantially surrounds the second POCM, the second metal housing having an opening formed therein through which ends of at least third and fourth optical fiber ribbon cables pass, the ends of the third and fourth optical fiber ribbon cables being connected to the third and fourth POCSMs, respectively, the second metal housing acting as an electromagnetic interference (EMI) shield for the second POCM and protecting the third and fourth module PCBs and the third and fourth POCSMs from an environment surrounding the second POCM.

13. The optical communications system of claim 8, wherein the first and second module PCBs each have first and second vertical side edges that are substantially parallel to one another, the first and second vertical side edges of the first and second module PCBs being substantially perpendicular to the lower side edges of the first and second module PCBs, respectively, and wherein the first and second POCSMs are mounted at an angle to the first and second vertical side edges of the first and second module PCBs, respectively, that is greater than zero degrees and less than ninety degrees.

14. The optical communications system of claim 13, wherein the angle is between about thirty degrees and about sixty degrees.

15. The optical communications system of claim 9, wherein the third and fourth module PCBs each have first and second vertical side edges that are substantially parallel to one another, the first and second vertical side edges of the third and fourth module PCBs being substantially perpendicular to the lower side edges of the third and fourth module PCBs, respectively, and wherein the third and fourth POCSMs are mounted at an angle to the first and second vertical side edges of the third and fourth module PCBs, respectively, that is greater than zero degrees and less than ninety degrees.

16. The optical communications system of claim 15, wherein the angle is between about thirty degrees and about sixty degrees.

17. The optical communications system of claim 9, wherein the first, second, third, and fourth POCSMs each have at least a first laser diode driver integrated circuit (IC) chip and at least first, second, third, and fourth vertical cavity surface emitting laser diode (VCSEL) chips, each VCSEL chip having at least three vertical cavity surface emitting laser diodes (VCSELs) such that each POCSM has at least twelve transmit channels.

18. A method for high-density mounting of parallel optical communications modules (POCMs) in an optical communications system comprising:
providing a motherboard printed circuit board (PCB) having at least upper and lower surfaces that are generally parallel to one another;
mounting at least a first edge card connector on the upper surface of the motherboard PCB, the first edge card connector having at least first and second side walls that face one another and that are separated from one another by an air gap that forms a slot in the edge card connector, the edge card connector having electrical contacts disposed on at least one of the first and second side walls inside of the slot;
providing at least a first POCM comprising a first module PCB having at least first and second parallel optical communications sub-modules (POCSMs) mounted thereon and electrically interconnected with the first module PCB, a lower side edge of the first module PCB having electrical contacts thereon; and
inserting the lower side edge of the first module PCB into the slot of the first edge card connector such that the electrical contacts disposed on the lower side edge of the first module PCB are in contact with the electrical contacts of the first edge card connector, the lower side edge of the first module PCB is parallel to the upper surface of the motherboard PCB, and a plane of the first module PCB is oriented perpendicular to the upper surface of the motherboard, wherein the first and second POCSMs are mounted at an angle between zero and 90 degrees with respect to the lower side edge of the first module PCB; and
the first POCM is substantially surrounded by a first metal housing, the first metal housing having an opening formed in a wall thereof through which ends of at least first and second optical fiber ribbon cables pass in an orientation stacked together and substantially perpendicular to the wall, the first and second optical fiber ribbon cables curving in an arcuate shape within the housing between an orientation substantially perpendicular to the wall and the POCSMs, the ends of the first and second optical fiber ribbon cables being oriented at the angle at which the first and second POCSMs are mounted and being connected to the first and second POCSMs, respectively, the first metal housing acting as an electromagnetic interference (EMI) shield for the first POCM and protecting the first module PCB and the first and second POCSMs from an environment surrounding the POCM.

19. The method of claim 18, further comprising:
mounting at least a second edge card connector on the upper surface of the motherboard PCB beside the first edge card connector and spaced apart from the first edge card connector, the second edge card connector having at least first and second side walls that face one another and that are separated from one another by an air gap that forms a slot in the second edge card connector, the second edge card connector having electrical contacts disposed on at least one of the first and second side walls inside of the slot of the second edge card connector;
providing at least a second POCM comprising a second module PCB having at least third and fourth POCSMs mounted thereon and electrically interconnected with the second module PCB, a lower side edge of the second module PCB having electrical contacts thereon; and
inserting the lower side edge of the second module PCB within the slot of the second edge card connector such that the electrical contacts disposed on the lower side edge of the second module PCB are in contact with the electrical contacts of the second edge card connector.

20. The method of claim 19, wherein the second POCM is substantially surrounded by a second metal housing, the second metal housing having an opening formed therein through which ends of at least third and fourth optical fiber ribbon cables pass, the ends of the third and fourth optical fiber ribbon cables being connected to the third and fourth POCSMs, respectively, the second metal housing acting as an EMI shield for the second POCM and protecting the second module PCB and the third and fourth POCSMs from an environment surrounding the second POCM.

21. The method of claim 19, wherein the first and second module PCBs each have first and second vertical side edges that are substantially parallel to one another, the first and second vertical side edges of the first and second module PCBs being substantially perpendicular to the lower side edges of the first and second module PCBs, respectively, and wherein the first and second POCSMs are mounted at an angle to the first and second vertical side edges of the first module PCB that is greater than zero degrees and less than ninety degrees, and wherein the third and fourth POCSMs are mounted at an angle to the first and second vertical side edges of the second module PCB that is greater than zero degrees and less than ninety degrees.

22. The method of claim 21, wherein the first and second POCSMs are mounted at an angle to the first and second vertical side edges of the first module PCB that is between about thirty degrees and about sixty degrees, and wherein the third and fourth POCSMs are mounted at an angle to the first and second vertical side edges of the second module PCB that is between about thirty degrees and about sixty degrees.

23. The method of claim 19, wherein the first, second, third, and fourth POCSMs each have at least a first laser diode driver integrated circuit (IC) chip and at least first, second, third, and fourth vertical cavity surface emitting laser diode (VCSEL) chips, each VCSEL chip having at least three vertical cavity surface emitting laser diodes (VCSELs) such that each POCSM has at least twelve transmit channels.

24. A method for high-density mounting of parallel optical communications modules (POCMs) in an optical communications system comprising:
providing a motherboard printed circuit board (PCB) having at least upper and lower surfaces that are generally parallel to one another;
mounting at least a first edge card connector on the upper surface of the motherboard PCB, the first edge card connector having at least first and second side walls that face one another and that are separated from one another by an air gap that forms a slot in the edge card connector, the edge card connector having electrical contacts disposed on at least one of the first and second side walls inside of the slot;

providing at least a first POCM comprising at least a first and second parallel optical communications sub-modules (POCSMs) mounted on substantially co-planar first and second module PCBs, respectively, and electrically interconnected with the first and second module PCBs, respectively, wherein lower side edges of the first and second module PCBs having electrical contacts thereon; and inserting the lower side edges of the first and second module PCBs into the slot of the first edge card connector such that the electrical contacts disposed on the lower side edges of the first and second module PCBs are in contact with the electrical contacts of the first edge card connector and the lower side edge of the first module PCB is parallel to the upper surface of the motherboard PCB, and a plane of the first module PCB is oriented perpendicular to the upper surface of the motherboard, wherein the first and second POCSMs are mounted at an angle between zero and 90 degrees with respect to the lower side edge of the first module PCB; and the first POCM is substantially surrounded by a first metal housing, the first metal housing having an opening formed in a wall thereof through which ends of at least first and second optical fiber ribbon cables pass in an orientation stacked together and substantially perpendicular to the wall, the first and second optical fiber ribbon cables curving in an arcuate shape within the housing between an orientation substantially perpendicular to the wall and the POCSMs, the ends of the first and second optical fiber ribbon cables being oriented at the angle at which the first and second POCSMs are mounted and being connected to the first and second POCSMs, respectively, the first metal housing acting as an electromagnetic interference (EMI) shield for the first POCM and protecting the first module PCB and the first and second POCSMs from an environment surrounding the POCM.

25. The method of claim 24, further comprising:

mounting at least a second edge card connector on the upper surface of the motherboard PCB beside the first edge card connector and spaced apart from the first edge card connector, the second edge card connector having at least first and second side walls that face one another and that are separated from one another by an air gap that forms a slot in the second edge card connector, the second edge card connector having electrical contacts disposed on at least one of the first and second side walls inside of the slot of the second edge card connector;

providing at least a second POCM comprising at least third and fourth POCSMs mounted on third and fourth module PCBs, respectively, and electrically interconnected with the third and fourth module PCBs, respectively, wherein lower side edges of the third and fourth module PCBs have electrical contacts thereon; and inserting the lower side edges of the third and fourth module PCBs into the slot of the second edge card connector such that the electrical contacts disposed on the lower side edges of the third and fourth module PCBs are in contact with the electrical contacts of the second edge card connector.

26. The method of claim 25, further comprising:

securing at least a first metal heat dissipation plate to bottom surfaces of the first and second module PCBs for dissipating heat produced by the first and second POCSMs.

27. The method of claim 26, further comprising:

securing at least a second metal heat dissipation plate to bottom surfaces of the third and fourth module PCBs for dissipating heat produced by the third and fourth POCSMs.

28. The method of claim 24, wherein the first and second module PCBs each have first and second vertical side edges that are substantially parallel to one another, the first and second vertical side edges of the first and second module PCBs being substantially perpendicular to the lower side edges of the first and second module PCBs, respectively, and wherein the first and second POCSMs are mounted at an angle to the first and second vertical side edges of the first and second module PCBs, respectively, that is greater than zero degrees and less than ninety degrees.

29. The method of claim 28, wherein the angle is between about thirty degrees and about sixty degrees.

30. The method of claim 25, wherein the third and fourth module PCBs each have first and second vertical side edges that are substantially parallel to one another, the first and second vertical side edges of the third and fourth module PCBs being substantially perpendicular to the lower side edges of the third and fourth module PCBs, respectively, and wherein the third and fourth POCSMs are mounted at an angle to the first and second vertical side edges of the third and fourth module PCBs, respectively, that is greater than zero degrees and less than ninety degrees.

31. The method of claim 30, wherein the angle is between about thirty degrees and about sixty degrees.

32. The method of claim 25, wherein the first, second, third, and fourth POCSMs each have at least a first laser diode driver integrated circuit (IC) chip and at least first, second, third, and fourth vertical cavity surface emitting laser diode (VCSEL) chips, each VCSEL chip having at least three vertical cavity surface emitting laser diodes (VCSELs) such that each POCSM has at least twelve transmit channels.

* * * * *